United States Patent [19]

Allison, III

[11] 4,242,245

[45] Dec. 30, 1980

[54] RUBBERY POLYMER SEALANT COMPOSITIONS

[75] Inventor: George M. Allison, III, Bartlesville, Okla.

[73] Assignee: Phillips Petroleum Company, Bartlesville, Okla.

[21] Appl. No.: 27,686

[22] Filed: Apr. 6, 1979

[51] Int. Cl.³ .................................................. C08K 3/10
[52] U.S. Cl. ................................................ 260/27 BB
[58] Field of Search .................. 260/24, 27 R, 27 BB, 260/29.6 WQ, 29.7 SQ, 29.7 SE

[56] References Cited

U.S. PATENT DOCUMENTS

| | | | |
|---|---|---|---|
| 3,627,707 | 12/1971 | Giessler | 260/23 AR |
| 3,965,060 | 6/1976 | Lakshmanan | 260/27 BB |
| 3,978,013 | 8/1976 | Lakshmanan | 260/27 BB |
| 4,101,482 | 7/1978 | Doss | 260/27 BB |
| 4,101,484 | 7/1978 | Doss | 260/27 BB |

OTHER PUBLICATIONS

Kirk-Othmer, Encyclopedia of Chemical Technology, vol. 2, 1st ed., 1948, p. 320.
Morton, "Introduction to Rubber Technology", Reinhold Pub., p. 243.
Damusis, "Sealants", Reinhold Pub., 1967, pp. 52-55, 73.

*Primary Examiner*—Paul R. Michl

[57] ABSTRACT

A rubbery polymer sealant composition is provided that includes barium sulfate and a compound containing at least two acidic hydrogens wherein said acidic hydrogens are attached to oxygen atoms. The sealant composition has a good balance of properties, including texture, while having improved sag resistance and crack resistance.

15 Claims, No Drawings

RUBBERY POLYMER SEALANT COMPOSITIONS

BACKGROUND OF THE INVENTION

This invention relates to sealant compositions. In another aspect, this invention relates to rubber-based sealants. In still another aspect, this invention relates to a rubbery polymer-based sealant composition containing a thixotropic system comprising a barium sulfate filler and a compound containing at least two acidic hydrogens that are attached to oxygen atoms. In still another aspect, this invention relates to a rubbery polymer sealant composition containing a thixotropic system comprising barium sulfate and a substituted phenol antioxidant or water. In yet another aspect, this invention relates to a sealant composition comprising a rubbery polymer ingredient that does not contain any oxygenated functional groups, a modifying resin compatible with the rubbery polymer, a plasticizer and a thixotropic system comprising barium sulfate and a substituted phenol antioxidant or water. In another aspect, this invention relates to a rubber-based sealant with improved sag resistance comprised of an elastomeric-type polymer, modifying resins, plasticizers, fillers, hydrocarbon solvents and a substituted phenol antioxidant.

Sealants are applied to exterior building joints to prevent the passage of outside environmental conditions such as wind, rain, dust, noise, etc. One of the basic requirements for such a building sealant is that the sealant does not sag, particularly in vertical joints, before the sealant has set. Setting is sometimes referred to as curing or solvent evaporation depending on the type of sealant employed. To promote non-sag properties, certain additives, sometimes referred to as thixotropic agents, are added to the sealant composition. Such additives can be materials like clays, mineral carbonates, carboxymethyl cellulose, fumed silica, and barium sulfate.

U.S. Pat. No. 3,798,129 discloses the use of fumed silica as a thixotropic agent. Although satisfactory in many cases, the material can sometimes contribute to cracks. Texture is also a very important property for a sealant as the cracking of a sealant tends to aid deterioration and undermine the basic function of the sealant. It is also expensive and, thus, can raise the overall cost of the composition. Also, because of the ultra fine particle size and low bulk density of fumed silica, special breathing masks are recommended during its use.

U.S. Pat. No. 3,627,707 discloses the use of two types of barium sulfate (precipitated and water-ground) to impart thixotropic properties to gasket-forming compositions. Barium sulfate, as is the case with fumed silica, does not always work well by itself and sometimes requires additional materials to enhance thixotropic properties. Fumed silica can employ water as a complexing agent, however, nothing is reported necessary to aid in the thixotropic properties of barium sulfate even though the material does not always work as well as desired. It would be of some technical importance, as well as some economic advantage, if an agent could be found that would improve the sag resistance of a sealant containing barium sulfate without hindering the texture. It would be especially advantageous if the agent could serve in two or more capacities in the sealant composition. For example, a material to enhance the thixotropic character of barium sulfate that could also be used as a filler, pigment, antioxidant or other such type sealant ingredient.

Accordingly, it is an object of this invention to provide a rubber-based sealant composition with improved sag resistance.

Another object of this invention is to provide a means of improving sag resistance in a sealant composition.

Another object of this invention is to provide a sealant composition having improved crack resistance as well as improved sag resistance.

Still another object of this invention is to provide a means for improving the overall performance properties of a sealant.

Other objects, aspects, and the several advantages of this invention will be apparent to those skilled in the art upon a study of this disclosure and the appended claims.

SUMMARY OF THE INVENTION

In accordance with this invention, there is provided a sealant composition comprising a rubbery polymer ingredient that does not contain any oxygenated functional groups, a modifying resin that is compatible with said rubbery polymer, a plasticizer and a thixotropic system comprising barium sulfate and a compound containing at least two acidic hydrogens that are attached to oxygen atoms wherein the compound is selected from the group consisting of substituted phenols, water, glycols and polyols.

In a specific embodiment of this invention, the rubbery polymer ingredient of the sealant composition comprises a conjugated diene/vinyl aromatic copolymer, preferably a hydrogenated block copolymer. The preferred rubbery polymer ingredient is a butadiene styrene block copolymer.

In another embodiment of this invention, the compound containing at least two acidic hydrogens in the thixotropic system of the sealant composition is either a substituted phenol antioxidant or water, with substituted phenols being the preferred ingredient. Filler in addition to barium sulfate can also be present in the sealant composition without varying from the scope of the present invention.

DETAILED DESCRIPTION OF THE INVENTION

This invention relates to a sealant composition comprising a rubbery polymer, modifying resin, plasticizer, barium sulfate and a compound containing at least two acidic hydrogens that are attached to oxygen atoms. Said acidic hydrogen containing compound is preferably selected from the group consisting of substituted phenols, water, glycols and polyols. The preferred sealant composition comprises a substituted phenol antioxidant.

Rubber-based Polymer

Polymers useful as the base elastomeric ingredient in this invention can be any rubbery material, synthetic or natural, that does not contain oxygenated functional groups. By oxygenated functional groups is meant oxirane, carboxylic acid and hydroxyl groups. Thus, useful polymers can be, for example, polyolefins, neoprene, polyisoprene, butadiene-based homo-, co- and terpolymers and the like. Preferred polymers are the conjugated diene/vinyl aromatic copolymers, both linear and radial in structure. Generally, it is preferred that the conjugated diene to vinyl aromatic weight ratio be in the range of about 50/50 to 90/10 and that the copolymer also vary in weight average molecular weight from about 50,000 to about 500,000. The preparation of these copolymers is described in U.S. Pat. Nos. 3,281,383 and 3,639,521, the disclosures of which are hereby incorporated by reference; Canadian Pat. No. 652,080; and British Pat. No. 888,624.

The most preferred polymers are the hydrogenated conjugated diene/vinyl aromatic copolymers represented by the formulas

| ABA | and | (AB)$_x$Y |
|---|---|---|
| (linear block) | | (radial teleblock) | wherein A is a poly(vinyl-substituted aromatic) block segment containing 8 to 18 carbon atoms per molecule, B is a hydrogenated poly(conjugated diene) block segment containing 4 to 12 carbon atoms per molecule; Y is a residue of a polyfunctional coupling agent that must contain at least two reactive sites capable of reacting with the initiator (i.e. lithium)-carbon bond or a polyfunctional initiator; and x is at least 2, preferably from 2 to 4.

When Y is a polyfunctional coupling agent, it is derived from treating agents containing at least 2, preferably from 2 to 4, functional groups per molecule. Useful coupling agents include polyepoxides, polyamines, polyisocyanates, polyaldehydes, polyketones, polyesters, polyanhydrides and polyhalides, with polyepoxides being the most preferred coupling agent.

When Y is a polyfunctional initiator it is derived from compounds of general formula R(Li)$_x$ where x is an integer of from 2 to 4 and R is an aliphatic, cycloalphatic or aromatic radical containing from 1 to 20 carbon atoms. Specific examples of useful polyfunctional initiators include dilithio methane, 1,4-dilithiobutane, 1,20-dilithioeicosane, 1,2-dilithio-1,2-diphenylethane, 1,4-dilithiocyclohexane, 1,3,5-trilithiopentane, 1,2,5-trilithionaphthalene, 1,3,5,8-tetralithiodecane, and 1,2,3,5-tetralithiocyclohexane.

Generally, the average molecular weight for the above described hydrogenated polymers can range from about 50,000 to about 250,000.

Modifying (Tackifying) Resins

Modifying resins, sometimes referred to as tackifiers, useful in this invention can be any of those common to the sealant industry. The only requirement is that the resin be compatible with the base polymer. Compatibility can be determined by a method described in U.S. Pat. No. 3,917,607, which disclosure is hereby incorporated by reference. Examples of various modifying resins include esters of polymerized rosin, polyterpene resins, terpenephenolic resins, coumaroneindene resins, diolefin-olefin resins, phenol-aldehyde resins, and aromatic resins. Typical modifying resins for hydrogenated conjugated diene/vinyl aromatic copolymer are, for example, but not limited to polymers or copolymers based on: alpha and beta pinene, dipentene, alpha methyl styrene, vinyl toluene-alpha methyl styrene, d-limonene as well as hydrogenated resins and esters. Typical modifying resins for unsaturated conjugated diene/vinyl aromatic copolymers are, for example, but not limited to: rosin acids and rosin acid esters, aromatic polymers, polyterpenes, hydrogenated resins and any vinyl aromatic (e.g. styrene) resin capable of association or compatibility with the polyvinyl aromatic segment of the base polymer described herein.

Thickener System

The thickener system useful in this invention is a combination of at least two ingredients that provide non-sag properties to the rubbery-sealant composition described herein. The first of these ingredients is barium sulfate, preferably finely divided precipitated grade barium sulfate having a particle size of 0.1–25 microns. The material is sometimes referred to as "Blanc Fixe". It can be used in the present invention as both a filler and as a thixotropic ingredient.

The second of the two thixotropic ingredients is preferably a substituted, hindered phenol comprised of at least two acidic hydrogen atoms associated with an oxygen atom attached to an aromatic group and represented by the formula R'—(OH)$_n$ wherein R' is a substituted aromatic group containing radical and n is at least 2, preferably 2 to 4. These type materials are commonly employed as antioxidants and, hence, the materials can in this invention serve in two capacities, namely as an antioxidant and as a thixotropic co-ingredient. The dual roles for the barium sulfate and hindered phenol used in this invention provides the uniqueness of the invention. Typical antioxidant-thixotropic compounds are, for example, but not limited to:

1. 2,2'-Methylenebis(4-methyl-6-t-butyl phenol)
2. 2,2'-Methylenebis(4-ethyl-6-t-butyl phenol)
3. 2,2'-Thiobis(4-methyl-6-t-butyl phenol)
4. 1,1'-Thiobis(2-naphthol)
5. Tetrakis methylene 3-(3', 5'-di-t-butyl-4'-hydroxyphenyl) propionate methane
6. 2,2-Methylene bis [6-(1-methylcyclohexyl)-p-cresol]
7. 4,4'-Thiobis(6-t-butyl-m-cresol)
8. 4,4'-Butylidenebis(6-t-butyl-m-cresol)
9. 4,6-Di(4-hydroxy-3,5-di-t-butylphenoxy)-2-octylthio-1,3,5-triazine
10. 1,3,5-Trimethyl-2,4,6-tris(3,5-di-t-butyl-4-hydroxybenzyl)benzene The preferred antioxidant of this invention is No. 5 listed above, which is available from Ciba-Geigy as Irganox 1010, and can be shown structurally as follows:

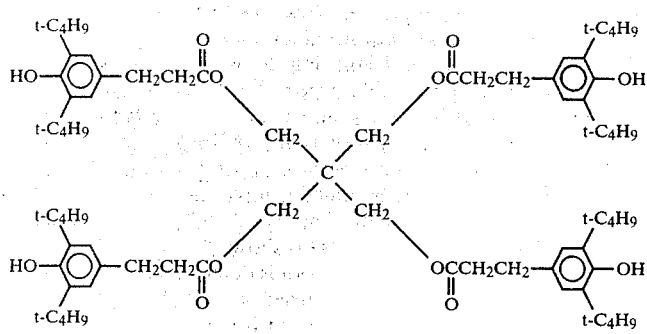

The weight ratio of barium sulfate to substituted phenol antioxidant can vary broadly, but is generally preferred to be in the range of about 5:1 to 100:1 with the most preferred range being 10:1 to 50:1. Generally, the amount of substituted phenol used in the total sealant composition is about 1 to 2 wt. %. This includes both the amount used as a thixotropic material and the amount used as an antioxidant.

Other materials containing two acidic hydrogens wherein said hydrogens are attached to oxygen atoms are also within the scope of this invention and can be used as a substitute thixotropic ingredient for the substituted phenol. These materials do not generally perform as well as the substituted phenols and, therefore, the phenols are the preferred additives. Examples of such materials are glycols, polyols and water.

Additional Fillers, Plasticizers, Etc.

In addition to the main ingredients, namely the rubbery polymer, tackifier and 2-component thixotropic system, the sealant composition of this invention can also contain a plasticizer. The plasticizer can be any common plasticizer known in the sealant industry. The sealant composition can also contain other additives. For instance, pigments, wetting agents, additional antioxidants, curatives, U.V. absorbers, reinforcing agents, or fillers can be added. The kind and quantity of such additives depends upon the ultimate use or application of the composition.

Solvents

The sealant composition can be used as a hot melt, in which case no solvent is employed, or as a solvent-release composition. When the composition is used as a solvent-release system, the solvents used must be inert. Useful solvents include paraffinic, cycloparaffinic and aromatic hydrocarbons, such as pentane, hexane, octane, methylcyclopentane, cyclohexane, benzene, toluene, xylene and mixtures thereof. Other liquid organic solvents such as halogenated hydrocarbons, ethers, esters, ketones, and the like can also be employed as a solvent for the sealant composition of this invention. The amount of solvent used can vary in broad ranges and depends upon the viscosity of the sealant composition desired. Generally, the amount of solvent will be less than about 20 weight percent to comply with civil regulations.

General Sealant Formulation

The amounts of the above-described ingredients used in the inventive formulation can vary depending upon the ultimate use or application of the composition. As a guide to one skilled in the art, however, the sealant composition described in this invention can be represented by the following general formulation wherein operable ranges for each ingredient is listed.

|  | Based on Parts per Hundred Polymer | |
| --- | --- | --- |
|  | Broad | Preferred |
| Polymer | 100 | 100 |
| Modifying Agent(s) | 25–200 | 50–100 |
| Plasticizer | 25–300 | 175–250 |
| Other Fillers, pigments, etc. | 0–1000 | 0–800 |
| Thixotropic System |  |  |
| - Barium Sulfate | 100–2000 | 200–1500 |
| - Substituted Phenol Antioxidant | 1–20 | 2–10 |
| Solvent(s) | 50–500 | 150–350 |

The sealant formulation of this invention is useful in sealing a wide variety of substrates. All common materials of construction, such as glass, aluminum, steel, concrete, brick, rock, ceramic, wood, etc. can be sealed by use of the inventive sealant.

The following examples serve to illustrate the operability of this invention.

EXAMPLE I

The following is a typical mixing procedure used to prepare the compositions described herein. To a one-quart Baker-Perkins mixer equipped with dispersion blades was added 244 grams of mineral spirits, 61 grams of toluene, 60 grams of a polymerized mixed olefin tackifier (Wingtack ® 95, Goodyear Tire and Rubber), and 40 grams of a poly alpha-methylstyrene tackifier (Kristalex ® 1200 Hercules, ring and ball 120° C.). A flat glass plate was placed over the top of the mixing cavity to retard solvent loss during mixing. After about 30 mins. mixing, the tackifiers were completely dissolved whereupon 100 grams of hydrogenated 70 wt. % butadiene/30 wt. % styrene radial teleblock copolymer (Solprene ® 512, $M_w$ 95,000<30 wt. % vinyl unsaturation in polymer before hydrogenation) was added and the mixing continued for 45 mins. To this homogeneous mixture wad added 585 grams calcium carbonate (atomite ®), 15 grams fumed silica (Cab-O-Sil ®), 37.5 grams titanium dioxide and the mixing continued until a smooth consistency resulted (generally 15 mins.). To this mixture was added 100 grams of a paraffinic oil (Tufflo 6056, Arco Chemical Co.) and 25 grams of a poly 1-butene oil (Indopol L-14 Amoco Chemical Co.) and the mixing continued for an additional 20 mins. Added to this mixture was the balance of materials, 585 grams calcium carbonate, 15 grams fumed silica, 37.5 grams titanium dioxide, 3 grams substituted phenol herein defined (Irganox 1010, Geigy Industrial Chemicals), 100 grams Tufflo 6056, and 25 grams Indopol L-14. The mixing was continued for another 30 mins. or until the composition exhibited a smooth consistency. Generally, the total mixing time is 2 to 3 hours. The composition is then removed from the mixer and placed in an air-tight container until tested.

The principal performance test relating to the current invention is the slump test described in Federal Specification Test TT-S-001657 for single component, solvent release type sealing compounds used for building construction. The test is also described in ASTM D2202. Basically the test requires a slump no greater than 0.15 inch (0.381 cm) after 30 mins. at 70° C. Other performance tests such as elongation, tensile strength and hardness are carried out in accordance to ASTM D412- improved. Adding water to the composition (Run 5) reduces slump value below specification while improving tensile strength and elongation. However, small cracks develop. Replacing the water with a substituted hindered phenol like Irganox 1010, Run 6, results in a sealant with good slump resistance and no cracks. In addition the elongation is increased from 100 percent to 187 percent. The sealant compositions employing the barium sulfate filler all have lower hardness values then those compositions employing calcium carbonate/fumed silica. The data also show, Run 7, that too much substituted hindered phenol is detrimental to the performance properties of the dried sealant although the sealant still retains a smooth finish with no visible cracks.

Table I.

"Performance Properties of Various Sealant Compositions

| Run No.: | | 1 | 2 | 3 | 4 | 5 | 6 | 7 |
|---|---|---|---|---|---|---|---|---|
| A. | Sealant Ingredients, grams | | | | | | | |
| 1. | Bd/Sty Copolymer$^a$ | 100 | 100 | 100 | 100 | 100 | 100 | 100 |
| 2. | Tackifier A$^b$ | 60 | 60 | 60 | 60 | 60 | 60 | 60 |
| 3. | Tackifier B$^c$ | 40 | 40 | 40 | 40 | 40 | 40 | 40 |
| 4. | Barium Sulfate$^d$ | — | — | — | 1200 | 1200 | 1200 | 1200 |
| 5. | Calcium Carbonate$^e$ | 1170 | 1170 | 1170 | — | — | — | — |
| 6. | Fumed Silica$^f$ | 30 | 30 | 30 | — | — | — | — |
| 7. | Titanium Dioxide | 75 | 75 | 75 | 75 | 75 | 75 | 75 |
| 8. | Paraffinic Oil$^g$ | 200 | 200 | 200 | 200 | 200 | 200 | 200 |
| 9. | Poly 1-butene Oil$^h$ | 50 | 50 | 50 | 50 | 50 | 50 | 50 |
| 10. | Mineral Spirits | 244 | 244 | 244 | 244 | 244 | 244 | 244 |
| 11. | Toluene | 61 | 61 | 61 | 61 | 61 | 61 | 61 |
| 12. | Water | — | 3 | — | — | 3 | — | — |
| 13. | Irganox 1010$^i$ | — | — | 3 | — | — | 3 | 6 |
| B. | Performance Properties | | | | | | | |
| 1. | Slump, inches at 70° C. | 1.4 | 0.3 | none | 1.1 | 0.1 | 0.1 | 0.2 |
| 2. | Tensile Strength, psi | 301 | 246 | 142 | 65 | 115 | 96 | 65 |
| 3. | Hardness, Shore A | 67 | 64 | 60 | 42 | 40 | 40 | 40 |
| 4. | % Elongation | 50 | 50 | 75 | 100 | 112 | 187 | 100 |
| 5. | Texture | Smooth | Small Cracks | Large Cracks | Smooth | Small Cracks | Smooth | Smooth |

$^a$Solprene 512, Phillips Petroleum Co.
$^b$Wingtack 95, Goodyear Tire and Rubber
$^c$Kristolex 1120, Hercules Chemical Co.
$^d$Blanc Fixe .2 to 5 microns, Kraft Chemicals Co.
$^e$Atomite, 2.5 microns average, Thompson-Weinman Co.
$^f$Cab-O-Sil, Cabot Corp.
$^g$Tufflo 6056, Amoco Chemical Corp.
$^h$Indopol L-14, Arco Chemical Co.
$^i$Tetrakis methylene 3-(3',5'-di-t-butyl-4'-hydroxyphenyl)propionate methane.

75. The samples for these tests were prepared by filling a picture frame type mold, 6.25 cm (2.5 inch)×6.25 cm (2.5 inch)×0.3175 cm (0.125 inch) with the sealant composition and drying for 24 hours at 70° C. to remove the solvents. Before testing, all samples were allowed to equilibrate at room temperature for a minimum of two hours.

EXAMPLE II

Employing the mixing and testing procedures described in Example I, several sealant compositions were prepared and evaluated. The results of this evaluation are shown in Table I. Run No. 1 is the control where it can be seen that the slump is unsatisfactory according to the specification. When water is added to the formulation (Run No. 2) slump is considerably improved but the sealant begins to develop small cracks. When a substituted hindered phenol is used to replace water in the composition (Run 3), no slump occurs but large cracks form and the tensile strength is greatly diminished.

Replacing the calcium carbonate filler and the fumed silica thixotropic agent with finely divided barium sulfate filler, Blanc Fixe, Run No. 4, the slump is only slightly improved, however the elongation is greatly

EXAMPLE III

Barium sulfate is less expensive than fumed silica but more expensive than calcium carbonate and, thus, limited use of this filler-thixotrope ingredient should be economically beneficial. The data shown in Table II illustrate the results when half of the barium sulfate normally employed (Runs 4–7, Table I) is replaced with a mixture of calcium carbonate/fumed silica. For ease of comparison, Run 6 has been included in Table II. In Run 8, half of the barium sulfate used in Run 6 is replaced with calcium carbonate. The slump value goes up significantly as well as tensile strength and hardness while the elongation decreases. Increasing the amount of substituted phenol present (Run 9) reduces slump but also elongation yet the composition is free of cracks. Replacing a small portion of calcium carbonate filler with fumed silica (Run 10) reduces slump to zero, but the system exhibits some cracks and has very low elongation and tensile strength. Replacing the substituted phenol in Run 10 with water (Run 11) gives a composition with no cracks and slightly improved performance properties. Removing the fumed silica from Run 11

(Run 12) produced a sealant composition that had no slump but had decreased tensile strength and elongation as well as small surface cracks. Runs 13 and 14 show that a sealant composition containing barium sulfate without either a substituted hindered phenol or water present results in a sealant composition with sag values greater than specification and thus unsatisfactory.

Table II

"Performance Properties of Sealant Compositions Employing 50:50 Mixture of Barium Sulfate-Calcium Carbonate/Fumed Silica

| Run No.: | 6 | 8 | 9 | 10 | 11 | 12 | 13 | 14 |
|---|---|---|---|---|---|---|---|---|
| A. Sealant Ingredients, grams | | | | | | | | |
| 1. Bd/Sty Copolymer[a] | 100 | 100 | 100 | 100 | 100 | 100 | 100 | 100 |
| 2. Tackifier A[b] | 60 | 60 | 60 | 60 | 60 | 60 | 60 | 60 |
| 3. Tackifier B[c] | 40 | 40 | 40 | 40 | 40 | 40 | 40 | 40 |
| 4. Barium Sulfate | 1200 | 600 | 600 | 600 | 600 | 600 | 600 | 600 |
| 5. Calcium Carbonate | — | 600 | 600 | 570 | 570 | 600 | 60 | 570 |
| 6. Fumed Silica | — | — | — | 30 | 30 | — | — | 30 |
| 7. Titanium Dioxide | 75 | 75 | 75 | 75 | 75 | 75 | 75 | 75 |
| 8. Paraffinic Oil | 200 | 200 | 200 | 200 | 200 | 200 | 200 | 200 |
| 9. Poly 1-butene Oil | 50 | 50 | 50 | 50 | 50 | 50 | 50 | 50 |
| 10. Mineral Spirits | 244 | 244 | 244 | 244 | 244 | 244 | 244 | 244 |
| 11. Toluene | 61 | 61 | 61 | 61 | 61 | 61 | 61 | 61 |
| 12. Water | — | — | — | — | 6 | 6 | — | — |
| 13. Irganox 1010[d] | 3 | 3 | 6 | 3 | — | — | — | — |
| B. Performance Properties | | | | | | | | |
| 1. Slump, inches at 70° C. | 0.1 | 0.3 | <0.1 | none | <0.1 | none | 0.9 | 1.1 |
| 2. Tensile Strength, psi | 96 | 126 | 110 | 48 | 80 | 53 | 117 | 129 |
| 3. Hardness, Shore A | 40 | 58 | 50 | 55 | 55 | 50 | 54 | 63 |
| 4. % Elongation | 187 | 100 | 75 | 10 | 50 | 25 | 75 | 63 |
| 5. Texture | Smooth | Smooth | Smooth | Cracks | Smooth | Small Cracks | Smooth | Smooth |

[a] Solprene 512
[b] see footnote b of Table I
[c] see footnote c of Table I
[d] see footnote i of Table I An additional feature of replacing a portion of the barium sulfate with calcium carbonate is weight reduction. Barium sulfate has a density of about 4.50 at 15° C. and is significantly heavier than calcium carbonate which has a density of about 2.93.

SUMMARY

Based on the data herein disclosed, the following summary can be made.

1. Elongation values are higher with sealant compositions using barium sulfate as a filler-thixotrope than when a known filler, calcium carbonate, and a known thixotropic agent, fumed silica are used regardless of whether a substituted phenol or water is also added.

2. Sump resistance is improved when a substituted phenol or water is added to a sealant composition employing barium sulfate. However, the slump value is still about the same as when a known thixotropic material, fumed silica and a substituted phenol or water, is employed.

3. Cracks are generally present when water is used in the sealant composition. The use of a substituted phenol in place of water reduces crack formation.

4. A 50:50 mixture of barium sulfate-calcium carbonate/fumed silica is better as a filler-thixotrope ingredient than an all barium sulfate filler-thixotrope ingredient because the system is less dense and less costly while it still maintains satisfactory performance properties.

Certain modifications of the invention will become apparent to those skilled in the art and the illustrative details enclosed are not to be construed as imposing unnecessary limitations on the invention.

I claim:

1. A sealant composition comprising:

100 parts by weight of a rubbery polymer ingredient that does not contain any oxygenated functional groups,
25–200 parts by weight of modifying resin that is compatible with said rubbery polymer,
25 to 300 parts by weight of a plasticizer,
100–2000 parts by weight of barium sulfate, and
1–20 parts by weight of a compound containing at least two acidic hydrogens that are attached to oxygen atoms wherein said compound is selected from the group consisting of substituted phenols, glycols and polyols.

2. The composition of claim 1 wherein said rubbery polymer ingredient is a conjugated diene/vinyl aromatic copolymer.

3. The composition of claim 2 wherein the conjugated diene to vinyl aromatic weight ratio in said copolymer is in the range of about 50/50 to 90/10.

4. The composition of claim 2 wherein said copolymer is a hydrogenated conjugated diene/vinyl aromatic copolymer represented by a formula selected from ABA and $(AB)_xY$ where A is a poly(vinyl-substituted aromatic) block segment containing 8 to 18 carbon atoms per molecule, B is a hydrogenated poly(conjugated diene) block segment containing 4 to 12 carbon atoms per molecule; Y is a residue of a polyfunctional coupling agent that must contain at least two reactive sites capable of reacting with the initiator-carbon bond or a polyfunctional initiator; and x is at least 2.

5. The composition of claim 2 wherein said conjugated diene is 1,3-butadiene and said vinyl aromatic compound is styrene.

6. The composition of claim 1 wherein said modifying resin is present in an amount within the range of 50 to 100 parts by weight per 100 parts by weight of rubbery polymer ingredient, said plasticizer is present in an amount within the range of about 175 to 250 parts by weight per 100 parts by weight of said rubbery polymer, barium sulfate is present in an amount within the range of about 200 to 1500 parts by weight per 100 parts by weight of rubbery polymer, and said compound containing at least two acidic hydrogens is present in an amount within the range of about 2 to 10 parts by weight per 100 parts by weight of rubbery polymer.

7. The composition of claim 1 further comprising a solvent to give a solvent-release sealant formulation.

8. The composition of claim 1 wherein said compound containing at least two acidic hydrogens is a substituted phenol.

9. The composition of claim 8 wherein said substituted phenol is selected from the group consisting of 2,2'-methylenebis(4-methyl-6-t-butyl phenol), 2,2'-methylenebis(4-ethyl-6-t-butyl phenol), 2,2'-thiobis(4-methyl-6-t-butyl phenol), 1,1'-thiobis(2-naphthol), tetrakis methylene 3-(3',5'-di-t-butyl-4'-hydroxyphenyl) propionate methane, 2,2-methylene bis [6-(1-methylcyclohexyl)-p-cresol], 4,4'-thiobis(6-t-butyl-m-cresol), 4,4'-butylidenebis(6-t-butyl-m-cresol), 4,6-di(4-hydroxy-3,5-di-t-butylphenoxy)-2-octyl-thio-1,3,5-triazine, 1,3,5-trimethyl-2,4,6-tris(3,5-di-t-butyl-4-hydroxybenzyl) benzene.

10. The composition of claim 9 wherein said substituted phenol is tetrakis methylene 3-(3',5'-di-t-butyl-4'-hydroxyphenyl) propionate methane.

11. The composition of claim 8 wherein the weight ratio of barium sulfate to substituted phenol is in the range of about 5:1 to 100:1.

12. The composition of claim 11 wherein the weight ratio of barium sulfate to substituted phenol is in the range of about 10:1 to 50:1.

13. The composition of claim 8 wherein the amount of substituted phenol present in the sealant composition is about 1 to 2 weight percent based on the weight of the total sealant composition.

14. The composition of claim 1 further comprising filler in addition to barium sulfate in an amount up to about 1000 parts by weight per 100 parts by weight of rubbery polymer.

15. The composition of claim 14 wherein said additional filler is selected from the group consisting of calcium carbonate, fumed silica, and a mixture thereof.

* * * * *